United States Patent
Senner et al.

(10) Patent No.: US 7,820,333 B2
(45) Date of Patent: Oct. 26, 2010

(54) FUEL CELL OPERATING METHOD WITH IMPROVED HYDROGEN AND OXYGEN UTILIZATION

(75) Inventors: Ralf Senner, Pittsford, NY (US); Michael Cartwright, Naples, NY (US); John Wheat, Tomball, TX (US)

(73) Assignee: GM Global Technology Operations, Inc.

( * ) Notice: Subject to any disclaimer, the term of this patent is extended or adjusted under 35 U.S.C. 154(b) by 1240 days.

(21) Appl. No.: 11/113,574

(22) Filed: Apr. 25, 2005

(65) Prior Publication Data

US 2006/0240302 A1    Oct. 26, 2006

(51) Int. Cl.
*H01M 8/24* (2006.01)
*H01M 8/04* (2006.01)

(52) U.S. Cl. .................. 429/454; 429/458; 429/471; 429/512; 429/443

(58) Field of Classification Search .............. None
See application file for complete search history.

(56) References Cited

U.S. PATENT DOCUMENTS

| | | | | |
|---|---|---|---|---|
| 5,478,662 A | * | 12/1995 | Strasser | 429/13 |
| 6,251,534 B1 | * | 6/2001 | McElroy | 429/13 |
| 6,821,668 B1 | * | 11/2004 | Perry et al. | 429/38 |
| 7,479,333 B2 | * | 1/2009 | Bai et al. | 429/38 |
| 2005/0019648 A1 | * | 1/2005 | Rapaport et al. | 429/38 |
| 2005/0164069 A1 | * | 7/2005 | Margiott et al. | 429/38 |

FOREIGN PATENT DOCUMENTS

| EP | 1213780 A2 | | 6/2002 |
|---|---|---|---|
| EP | 1213780 A2 | * | 6/2002 |
| EP | 1294037 A2 | | 3/2003 |

* cited by examiner

*Primary Examiner*—Dah-Wei D Yuan
*Assistant Examiner*—Edu E Enin-Okut
(74) *Attorney, Agent, or Firm*—Harness, Dickey & Pierce, P.L.C.

(57) ABSTRACT

A fuel cell system wherein a plurality of fuel cells are arranged in a series of stages, the number of fuel cells decreasing in number in each stage from anode gas inlet to the anode gas outlet. The system allows for parallel flow to all of the cells in a given stage and series flow between the various stages. A similar configuration is present on a cathode side of the system. However, the direction of flow is reversed, providing a greater number of cells in the stage nearest the cathode outlet and a fewer number of cells in the stage near the cathode gas inlet. The invention further provides for the various stages to be configured such that the direction of flow of the anode gas of a given stage is generally opposite the direction of flow of the cathode gas of a given stage.

9 Claims, 3 Drawing Sheets

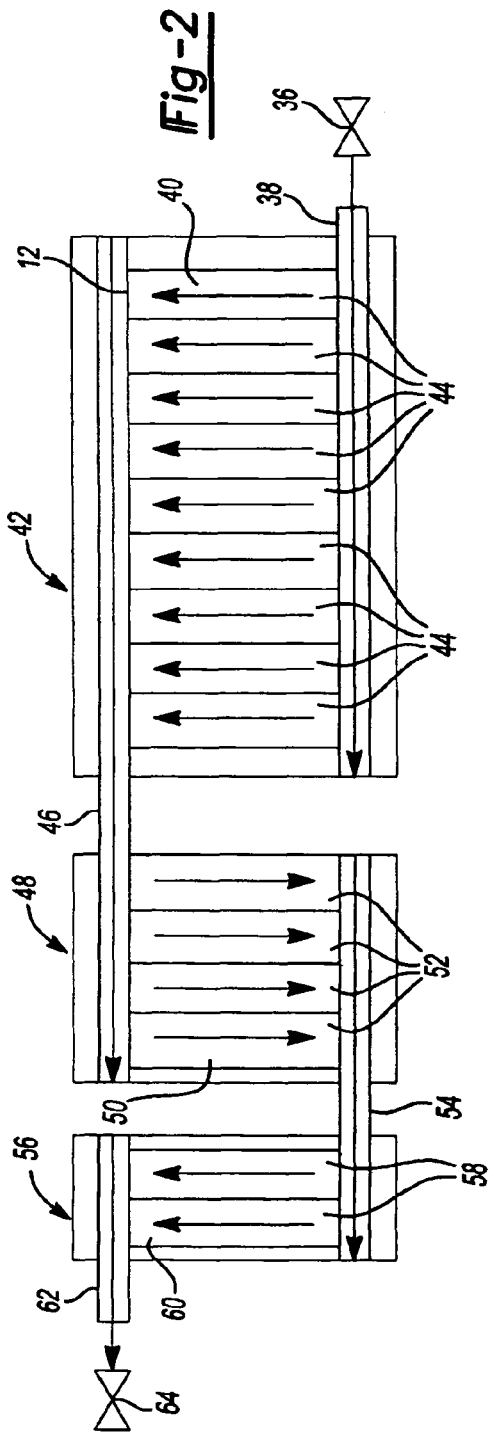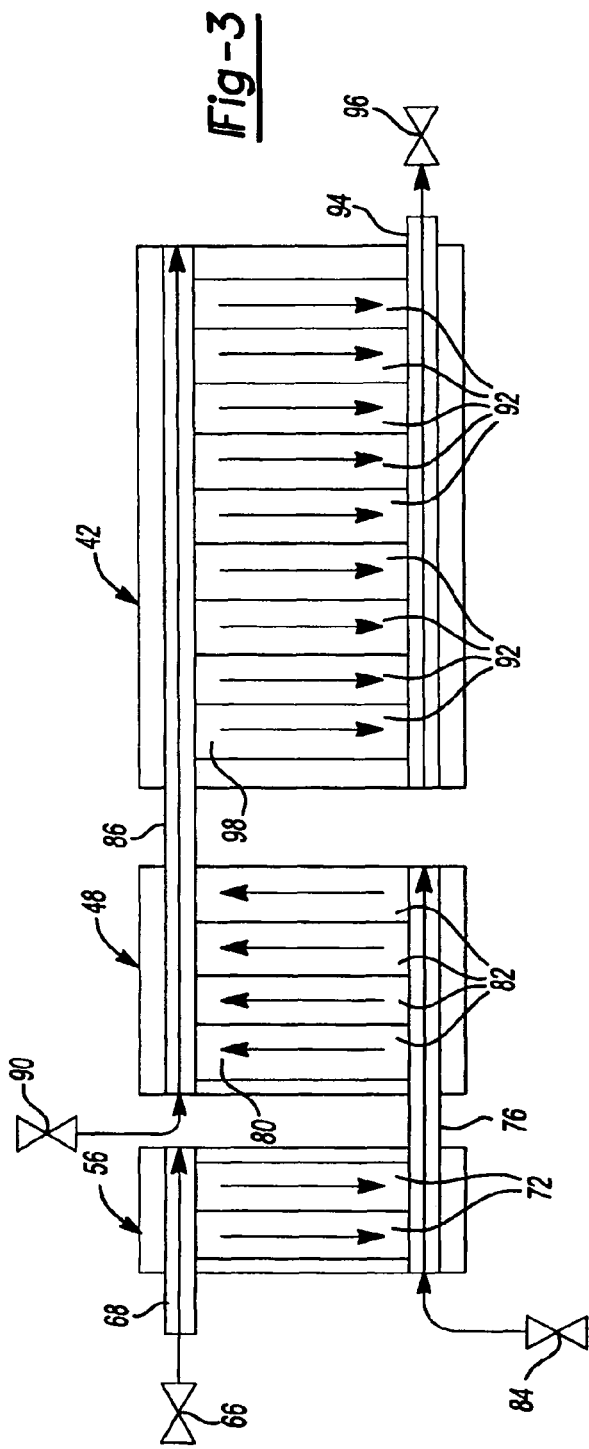

FUEL CELL OPERATING METHOD WITH IMPROVED HYDROGEN AND OXYGEN UTILIZATION

FIELD OF THE INVENTION

The present invention relates to fuel cells and, more particularly to controlling the relative humidity, air, and fuel distribution within fuel cells.

BACKGROUND OF THE INVENTION

Fuel cells are used as a power source for electric vehicles, stationary power supplies and other applications. One known fuel cell is the PEM (i.e., Proton Exchange Membrane) fuel cell that includes a so-called MEA ("membrane-electrode-assembly") comprising a thin, solid polymer membrane-electrolyte having an anode on one face and a cathode on the opposite face. The MEA is sandwiched between a pair of electrically conductive contact elements which serve as current collectors for the anode and cathode, which may contain appropriate channels and openings therein for distributing the fuel cell's gaseous reactants (i.e., $H_2$ and $O_2$/air) over the surfaces of the respective anode and cathode.

PEM fuel cells comprise a plurality of the MEAs stacked together in electrical series while being separated one from the next by an impermeable, electrically conductive contact element known as a bipolar plate or current collector. In some types of fuel cells each bipolar plate is comprised of two separate plates that are attached together with a fluid passageway therebetween through which a coolant fluid flows to remove heat from both sides of the MEAs. In other types of fuel cells the bipolar plates include both single plates and attached together plates which are arranged in a repeating pattern with at least one surface of each MEA being cooled by a coolant fluid flowing through the two plate bipolar plates.

The fuel cells are operated in a manner that maintains the MEAs in a humidified state. The level of humidity of the MEAs affects the performance of the fuel cell. Additionally, if an MEA is run too dry, the MEA can be damaged which can cause immediate failure or reduce the useful life of the fuel cell. To avoid drying out the MEAs, the typical fuel cells are operated in a condition wherein the humidity of the MEA is greater than 100% and liquid water is formed in the fuel cell during the production of electricity. Additionally, the cathode and/or anode reactant gases being supplied to the fuel cell are also humidified to prevent the drying of the MEAs in the locations proximate the inlets for the reactant gases.

The operation of the fuel cells with the MEAs humidified greater than 100%, however, limits the performance of the fuel cell stack. Specifically, the formation of liquid water impedes the diffusion of gas to the MEAs, thereby limiting their performance. The liquid water also acts as a flow blockage reducing cell flow and causing even higher fuel cell relative humidity which can lead to unstable fuel cell performance. Additionally, the formation of liquid water within the cell can cause significant damage when the fuel cell is shut down and is exposed to freezing conditions. That is, when the fuel cell is nonoperational and the temperature in the fuel cell drops below freezing, the liquid water therein will freeze and expand, potentially damaging the fuel cell.

Thus, it would be advantageous to control and operate the fuel cell in a manner that prevents and/or limits the formation of liquid water therein. It would be further advantageous if such a control or operation of the fuel cell resulted in the MEA being operated at a humidified state that results in optimum performance.

Controlling the operating conditions within the fuel cell, however, has proved to be difficult. Specifically, the measuring and controlling of the humidity of the gaseous reactant streams flowing into the fuel cell can be difficult. Traditionally, a water vapor transfer device (WVT) is utilized to humidify the cathode reactant gas prior to entering into the fuel cell. The operation of the WVT, however, is difficult to characterize and, as a result, the exact humidity of the cathode reactant gas flowing into the fuel cell may be difficult to ascertain. The WVT device and associated hardware also adds cost and volume to the fuel cell system. Thus, it would also be advantageous to control and operate a fuel cell with a reduced or no need for a WVT.

SUMMARY OF THE INVENTION

The present invention includes a novel way of controlling the humidity of a fuel cell while at the same time providing a more efficient means of fuel and air distribution within the cell. Specifically, the present invention provides a system wherein a plurality of fuel cells are arranged in a series of stages, the number of cells decreasing in each stage from anode gas inlet to the anode gas outlet. The system allows for parallel flow to all of the cells in a given stage and series flow between the various stages. A similar configuration is present on the cathode side of the system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a schematic representation of a partial fuel cell system illustrating the flow path of anode gasses in the system;

FIG. 3 is a schematic representation of a partial fuel cell system illustrating the flow path of cathode gasses in the system.

DETAILED DESCRIPTION OF THE PREFERRED EMBODIMENTS

The following description of the preferred embodiment is merely exemplary in nature and is in no way intended to limit the invention, its application, or uses.

Figure 1:
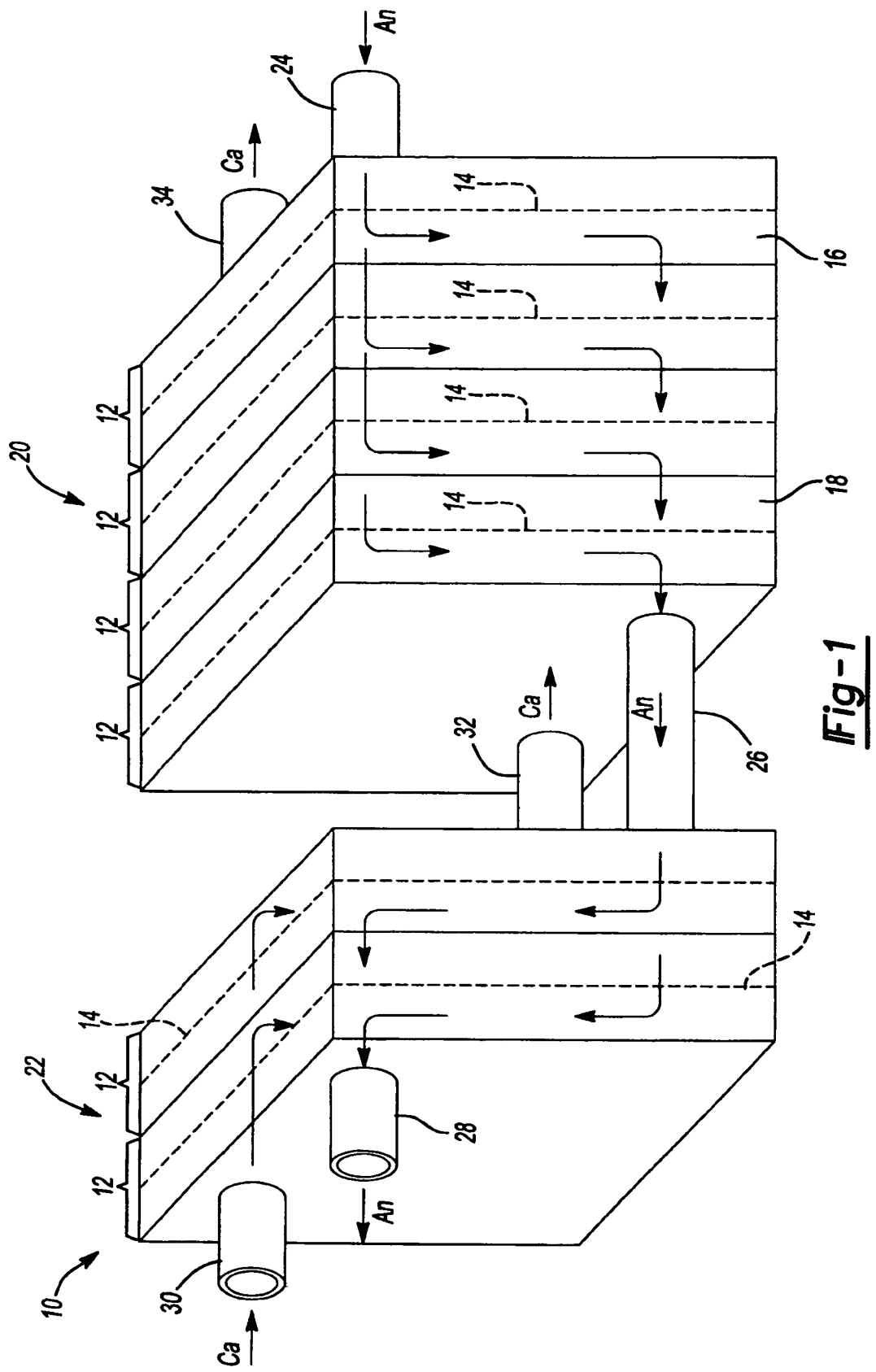
FIG. 1 is a simplified schematic view of a fuel cell system showing cathode and anode gas flow passages according to the principles of the present invention.

With reference to FIG. 1, a schematic view is provided of a fuel cell system 10 constructed in accordance with the teachings of the present invention. The fuel cell system 10 includes a plurality of fuel cells 12, each having a membrane electrode assembly (MEA) 14, an anode gas distribution layer provided on an anode gas flow field 16 and a cathode gas distribution layer provided on a cathode gas-flow field 18. The fuel cells 12 are arranged in a first stage 20 and a second stage 22. An anode gas inlet manifold 24 provides an inlet for anode gas introduced to the fuel cell system 10. An anode gas inlet/exhaust manifold 26 provides a connection for anode gas passing from the first stage 20 to the second stage 22. An anode gas exhaust manifold 28 provides an outlet for anode gasses exiting the fuel cell system 10. A cathode gas inlet manifold 30 provides an inlet for cathode gas introduced to the fuel cell system 10. A cathode gas inlet/exhaust manifold 32 provides a connection for cathode gas passing from the second stage 22 to the first stage 20. A cathode gas exhaust manifold 34 provides an outlet for cathode gasses exiting the fuel cell system 10. The first stage 20, by way of example, is comprised of four fuel cells 12 and the second stage 22 is comprised of two fuel cells 12. The anode gas inlet manifold 24 is coupled to the first stage 20 and is in communication with the anode gas flow field 16 of each MEA 14. The anode gas flow field 16 of each MEA 14 of the first stage 20 is coupled to the second stage 22 through the anode gas inlet/exhaust manifold 26. The anode gas is then able to exit the second stage 22 through the anode gas exhaust manifold 28 which is in communication with the anode gas flow side 16 of each MEA 14 in the second stage 22. The cathode gas inlet manifold 30 is coupled to the second stage 22 and is in communication with the cathode gas flow field 18. The cathode gas flow field 18 of each fuel cell 12 of the second stage 22 is coupled to the first stage 20 through the anode gas inlet/exhaust manifold 32. The cathode gas is then able to exit the first stage 20 through a cathode gas exhaust manifold 34 which communicates with the cathode gas flow field 18 of each fuel cell 12 of the first stage 20. It should be noted that the inlet and outlet at the cathode side may be reversed, allowing cathode flow in generally the same direction as anode flow.

FIGS. 2 and 3 are simplified schematic views of the fuel cell system 10 with each Figure illustrating the separate anode and cathode sections, respectively. In FIGS. 2 and 3, the fuel cell system 10 includes a first stage 42, a second stage 48 and a third stage 56. FIG. 2 depicts the anode section. The anode section includes an anode gas inlet valve 36. One configuration of an anode gas inlet valve 36 would use a mechanical pressure regulator to reduce the fuel pressure from a fuel storage unit to control the fuel flow into the stack 10. The regulator may be a dome-loaded design that will allow the pressure into the first stage to track the cathode inlet pressure entering the third stage 56. The inlet valve 36 is in communication with the anode gas inlet manifold 38, which is in communication with a series of anode flow field passages 44, eight in the present example, in the first stage 42. The anode flow field passages 44 are arranged in a parallel configuration, having an exit from the first stage 42 through a first anode gas inlet/exhaust manifold 46. The first anode gas inlet/exhaust manifold 46 serves as an inlet to the second stage 48 in the fuel cell system 10.

The first anode gas inlet/exhaust manifold 46 feeds a plurality of anode flow field passages 52, four in the present example, in the second stage 48. The number of anode flow field passages 52 in the second stage 48 is fewer in number than the number of anode flow field passages 44 in the first stage 42. The remaining anode gasses from the second stage 48 exit the second stage 48 and travel to the third stage 56 through a second anode gas inlet/exhaust manifold 54.

The remaining gasses then travel through a third plurality of anode flow field passages 58, two in the present example, in the third stage 56. The number of anode flow field passages 58 in the third stage 56 is fewer than the number of anode flow field passages 52 in the second stage 48. The gasses passing through the anode flow field passages 58 of the third stage 56 may exit the system through an anode gas exhaust manifold 62. An anode gas outlet valve 64 is in communication with the anode gas exhaust manifold 62 in order to assist in controlling system pressures. The anode gas outlet valve 64 may be an on/off solenoid or a proportional control valve. In the on/off configuration, the anode gas outlet valve 64 would be closed a majority of the time to allow inert gasses, which have diffused across the MEA 14 from the cathode or byproducts of fuel reforming, to build up in the third stage 56. The anode gas outlet valve 64 is opened periodically to purge inert gasses and water from the third stage 56 based on either the voltage in the third stage 56 or by predicted inert gas concentrations in the third stage 56. The cascaded design will result in an overall lower anode stack stoichiometry, compared to the stoichiometry in each stage of the stack.

The anode fuel gas is well humidified when it reaches the third stage 56. Through diffusion and electro-osmonic drag, water vapor will cross over to the air in the cathode gas distribution layer 18 of the stack, reducing or eliminating the need for inlet cathode humidification. Using dry or partly humidified cathode gas, flowing counter flow in the third stage 56 will prevent the accumulation of water in the outlet of the anode gas distribution layer 16 of the stack due to water diffusion across the MEA 14 and improve stack performance. With the decreasing number of fuel cells 12 in each successive stage 42, 48, 56 of the system, the anode gas velocity will stay the same or increase from stage to stage. The stoichiometry of the anode gas may increase or decrease from stage to stage, depending on the number of cells in each stage.

FIG. 3 depicts the cathode section. The cathode section includes an inlet valve 66 in communication with a cathode gas inlet manifold 68 provided in the third stage 56. The cathode gas inlet manifold 68 is in communication with the cathode gas flow field passages 72 of the third stage 56. The third stage 56 contains a plurality of cathode flow field passages 72, two in the present example. These passages are arranged parallel to one another, allowing gas to exit the third stage through a cathode gas inlet/exhaust manifold 76.

The cathode gas inlet/exhaust manifold 76 is in communication with the second stage 48. A second cathode gas inlet valve 84 is also in communication with the cathode gas inlet/exhaust manifold 76. The second stage 48 includes a plurality of cathode flow field passages 82, four in the present example, arranged in a parallel configuration. These cathode flow field passages 82 allow gasses to pass to the first stage 42 through a second cathode gas inlet/exhaust manifold 86.

The second cathode gas inlet/exhaust manifold 86 is in communication with the first stage 42. A third cathode gas inlet valve 90 is in communication with the second cathode gas inlet/exhaust manifold 86. The first stage 42 contains a plurality of cathode flow field passages 92 arranged in a parallel configuration. The cathode flow field passages 92 communicate with a cathode gas exhaust manifold 94. The cathode gas exhaust manifold 94 is in communication with a cathode gas exhaust valve 96. The cascaded design should result in an overall lower cathode stack stoichiometry, compared to the stoichiometry in each stage of the stack.

The use of multiple cathode gas inlet valves 66, 84 and 90 provides for a lower cathode stack pressure drop than that in a cascaded system where all cathode flow is supplied to the third stage 56. This overall lower cathode stack pressure drop will result in a reduced energy requirement for the pump/compressor within the fuel cell system 10. It will also reduce the difference in pressure between the gas in the anode gas flow field passages and the gas in the cathode gas flow field passages in each cell 12 of the fuel cell system 10.

Referring back to FIG. 1, water is produced in the cathode gas distribution flow field passages 18 through an electrochemical reaction in the fuel cell 12. A portion of this water will diffuse across the MEA 14 to the anode, while the remaining water will exit each stage 20 and 22 in the cathode exhaust. The humidified exhaust oxidant gas of the upstream stage is mixed with the additional oxidant gas prior to entry into the downstream stage 20 thus humidifying the newly introduced cathode gas. Carrying the inert gasses from the upstream 22 to downstream stage 20 will also allow for increased velocity in the flow field channels of the downstream stage 20. An increase of velocity in the oxidant flow field has been shown to improve the removal of water droplets and improve stack performance, especially at low power. In the first stage 20, the last stage of cathode flow, the water vapor in the cathode stream will diffuse across the MEA 14 humidifying the anode inlet stream and eliminating the need for external humidification of the hydrogen stream.

Referring back to FIG. 3, the first valve 66 in communication with the cathode gas inlet manifold 68 may be removed and air may be used directly from the air delivery system. The cathode exhaust leaving the third stage 56 will mix with fresh oxidant, controlled by the second cathode gas inlet valve 84, and enter the second stage 48, thus humidifying the fresh oxidant. The second cathode gas inlet valve 84 is sized to allow for a large variation in cathode stoichiometry going into the second stage 48 and to have a pressure drop equal to the cathode pressure drop in the third stage 56. The cathode flow leaving the second stage 48 will mix with the fresh oxidant controlled by the third cathode gas inlet valve 90 prior to entering the first stage 42. The third cathode gas inlet valve 90 should also be capable of allowing a wide range of cathode stoichiometry entering the first stage 42 and should have a pressure drop equal to the cathode pressure drop across stages two 48 and three 56. The cathode gas outlet valve 96 is used to control back pressure for the cathode stack. A further benefit of the multiple valve design is an increase in system control flexibility. For example, if a stage becomes unstable due to flooding, the cathode stoichiometry in the problem stage can be increased to remove liquid water and dry the problem stage out.

With reference to FIGS. 2 and 3, the anode and cathode flow field passages 44, 52, 58, 72, 82 and 92 are arranged such that the flow of the anode gasses in the anode flow field passages 44, 52, 58 are generally opposite the direction of flow of the cathode gasses in the cathode gas flow field passages 72, 82 and 92. These generally opposite flow directions facilitate the passage of excess water between the anode and cathode flow field passages. This results in the benefit of reduction or even elimination of the need for external humidification. It should be noted that it is sufficient that the flow direction of the anode and cathode gasses is in opposite directions relative to each stage and that the opposite flow direction across each MEA, although beneficial, is not required to still obtain many of the benefits of the present invention.

Figure 4:
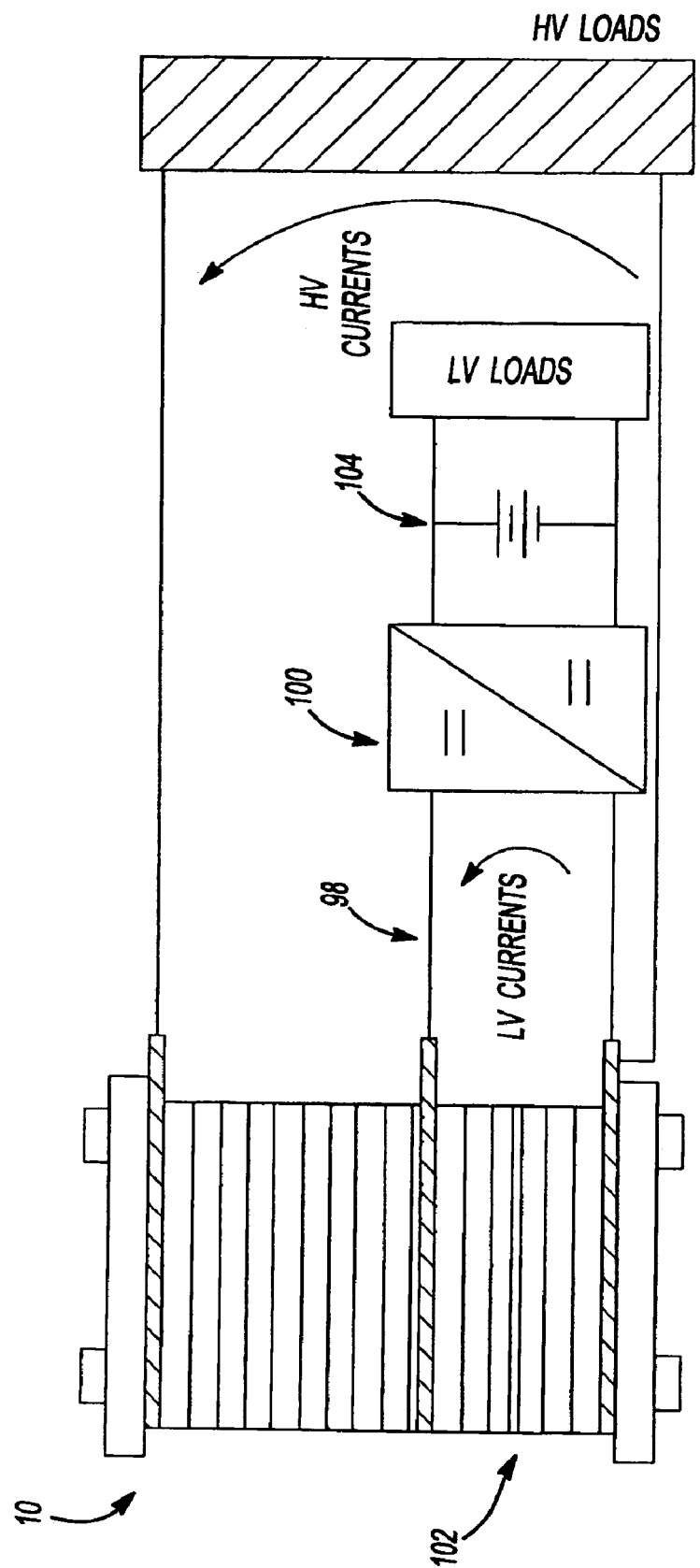
FIG. 4 is a schematic representation of a fuel cell system including a tap stack.

Another advantage of the present system is cost savings. FIG. 4 comprises a system to supply power to a secondary receiver 98 directly from the fuel cell system 10 at a voltage lower than that of the total system. An example of this would be supplying power directly to a 12 or 42 volt DC/DC converter 100 from a supply at a voltage lower than that of the total system voltage. To achieve this the cells in the smaller stages, stages two 48 and three 56 in the present example, can be used as a tap stack 102 to supply power at lower voltage to the 12 or 42-volt converters 100. To be able to sustain higher currents in the tap stack 102, a higher cathode and anode flow would be required for these cells. The valves 66, 84 and 90 at each of the cathode stages could be utilized to increase the flow of oxidant locally for the cells in the tapped region of the stack that is electrically producing higher current. Using a greater number of cells to supply the low voltage power will also reduce the additional current being drawn from the tap stack 102. As a result, the total flow needed locally for the tap stack 102 region is reduced.

A fuel cell system 10 that incorporates a 12 or 42-volt battery in addition to the tap stack 102, and low voltage DCDC converter 100 will also have additional control flexibility through local load control. It has been shown that stable performance can be achieved in a cell by quickly dropping the load while maintaining the reactant flows. When a large voltage battery buffer 104 is utilized in combination with the tap stack 102, and low voltage DCDC converter 100, the current being drawn from the tap stack 102 can be quickly dropped using the battery buffer 104 to buffer the consumed power.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell system comprising:
a plurality of fuel cells, each of said fuel cells including a membrane electrode assembly, an anode catalyst layer on a first side of said membrane electrode assembly and a cathode catalyst layer on a second side of said membrane electrode assembly, said plurality of fuel cells arranged in at least two stages, said plurality of fuel cells in each of said at least two stages are arranged in a parallel configuration and said stages are arranged in a series configuration, a first stage having a first plurality of fuel cells and a second stage having a second plurality of fuel cells, said first plurality of fuel cells comprising a greater number of fuel cells than said second plurality of fuel cells;
an anode gas inlet manifold in communication with said first stage;
at least one anode gas inlet/exhaust manifold, said anode gas inlet/exhaust manifold allowing anode exhaust gas to exit said first stage and allowing said anode exhaust gas to enter said second stage;
an anode gas exhaust manifold in communication with said second stage;
a cathode gas inlet manifold in communication with said second stage, said cathode gas inlet manifold including a first cathode gas inlet in direct communication therewith;
at least one cathode gas inlet/exhaust manifold, said cathode gas inlet/exhaust manifold allowing a cathode exhaust gas to exit said second stage and allowing said cathode exhaust gas to enter said first stage, said at least one cathode gas inlet/exhaust manifold further including a second cathode gas inlet in direct communication therewith;
a cathode gas exhaust manifold in communication with said first stage, wherein said anode gas inlet, said anode gas inlet/exhaust and said anode gas exhaust manifolds are positioned such that an anode gas flows in a first direction through said at least two stages, said cathode gas inlet, said cathode gas inlet/exhaust and said cathode gas exhaust manifolds positioned such that a cathode gas flows in a direction generally opposite said first direction;
a first cathode gas inlet valve in communication with said cathode gas inlet manifold providing said cathode gas to said second stage and via said cathode gas inlet/exhaust manifold to said first stage; and
a second cathode gas inlet valve in communication with said second cathode gas inlet providing additional cathode gas mixing with said cathode exhaust gas exiting said second stage prior to entrance into said first stage, said first and second cathode gas inlet valves together reducing a pressure drop across said cathode gas inlet, said cathode gas inlet/exhaust and said cathode gas exhaust manifolds.

2. The fuel cell system as claimed in claim 1, wherein said opposite flow directions of said anode gasses cause the gasses to be humidified by drawing water from a cathode gas side of said membrane electrode assembly through said membrane electrode assembly.

3. The fuel cell system as claimed in claim 1, wherein said opposite flow directions of said cathode gasses cause the gasses to be humidified by drawing water from the anode gas side of the membrane electrode assembly through said membrane electrode assembly.

4. The fuel cell as claimed in claim 1, wherein said anode gas inlet manifold is in communication with an anode gas inlet valve.

5. The fuel cell as claimed in claim 1, wherein said anode gas exhaust manifold is in communication with an anode gas exhaust valve.

6. The fuel cell as claimed in claim 1, wherein said cathode gas exhaust manifold is in communication with a cathode gas exhaust valve.

7. The fuel cell system as claimed in claim 1, wherein at least one stage having less fuel cells than said first stage is used as a tap stack to supply power at low voltage.

8. The fuel cell system as claimed in claim 1, wherein said fuel cell system includes at least three stages, said third stage including a third plurality of fuel cells, said first plurality of fuel cells being greater in number than said third plurality of fuel cells, said second plurality of fuel cells being fewer in number than said third plurality of fuel cells, said third stage disposed between said first stage and said second stage, said first stage being in communication with said third stage through a first anode gas inlet/exhaust manifold, said second stage being in communication with said third stage through a second anode gas inlet/exhaust manifold.

9. A fuel cell system comprising:
a plurality of fuel cells individually including a membrane electrode assembly, an anode catalyst layer on a first side of the membrane electrode assembly and a cathode catalyst layer on a second side of the membrane electrode assembly, the plurality of fuel cells arranged in at least two stages, the plurality of fuel cells in each of the at least two stages are arranged in a parallel configuration and the stages are arranged in a series configuration, a first stage having a first plurality of fuel cells and a second stage having a second plurality of fuel cells, the first plurality of fuel cells having a greater number of fuel cells than the second plurality of fuel cells;
an anode gas in communication with the first and second stages and flowing from the first stage to the second stage;
a cathode gas inlet manifold in communication with the second stage and including a first cathode gas inlet in direct communication therewith;
a cathode gas inlet/exhaust manifold allowing a cathode exhaust gas to exit the second stage and to enter the first stage, the cathode gas inlet/exhaust manifold further including a second cathode gas inlet in direct communication therewith;
a first cathode gas inlet valve in communication with the cathode gas inlet manifold providing the cathode gas to the second stage and via the cathode gas inlet/exhaust manifold to the first stage; and
a second cathode gas inlet valve in communication with the second cathode gas inlet providing additional cathode gas mixing with the cathode exhaust gas exiting the second stage prior to entrance into the first stage, the first and second cathode gas inlet valves together reducing a pressure drop across the cathode gas inlet, the cathode gas inlet/exhaust and the cathode gas exhaust manifolds.

* * * * *